United States Patent

Shemanske

[15] 3,678,351
[45] July 18, 1972

[54] MASTER-SLAVE MOTOR SYSTEM WITH START-UP CONTROL CIRCUIT

[72] Inventor: Richard Shemanske, Ithaca, N.Y.

[73] Assignee: Borg-Warner Corporation, Chicago, Ill.

[22] Filed: May 24, 1971

[21] Appl. No.: 146,260

[52] U.S. Cl..............................................318/61, 318/329
[51] Int. Cl. ........................................................H02p 1/56
[58] Field of Search..................318/53, 61, 64, 77, 310, 329, 318/449

[56] References Cited

UNITED STATES PATENTS

| | | | |
|---|---|---|---|
| 2,930,958 | 3/1960 | Schaufuss | 318/329 |
| 3,163,252 | 12/1964 | Kocl | 318/77 |
| 3,351,831 | 11/1967 | Hemphill | 318/77 |

*Primary Examiner*—Bernard A. Gilheany
*Assistant Examiner*—Thomas Langer
*Attorney*—Donald W. Banner and William S. McCurry

[57] ABSTRACT

A control circuit provides start-up speed control for a slave motor from a pot ganged to another pot regulating the master motor speed. The speed of either the master motor or slave motor is sensed. When the sensed speed reaches a preset value, control of the slave motor is switched from the start-up pot to a speed-indicating signal derived from the master motor.

9 Claims, 3 Drawing Figures

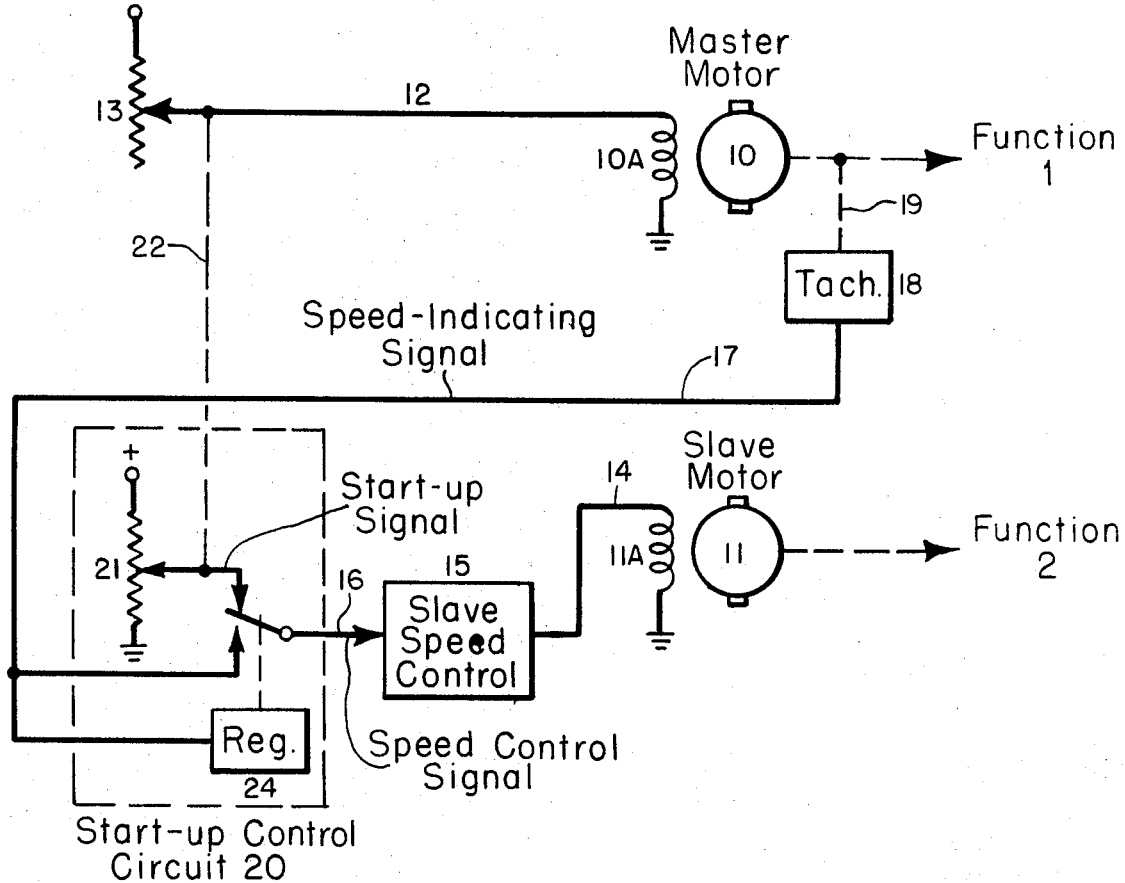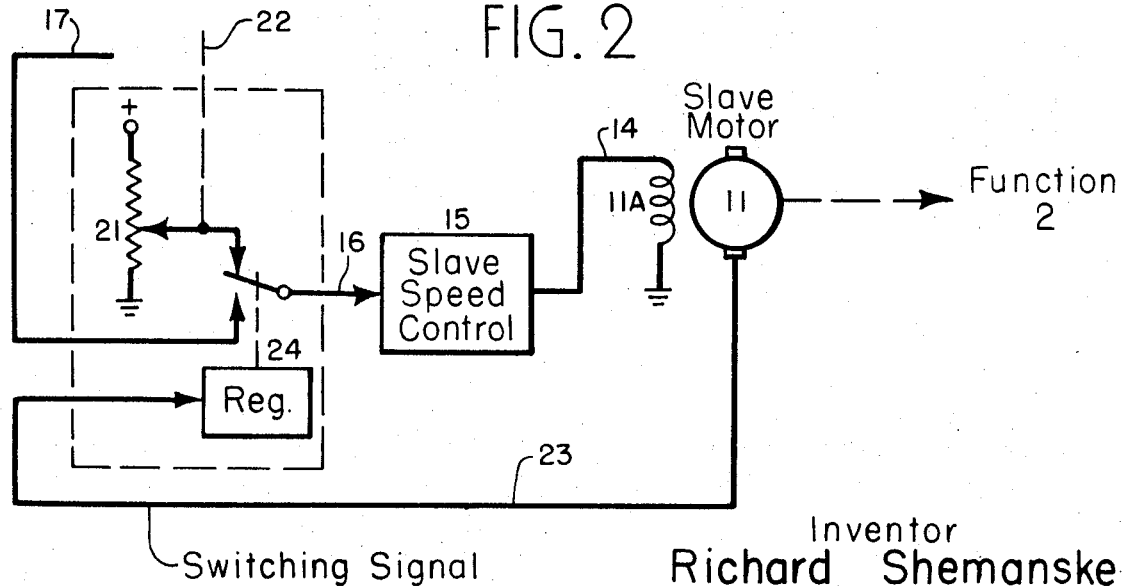

Inventor
Richard Shemanske
By James S. Jennings, Jr.
Attorney

# 3,678,351

MASTER-SLAVE MOTOR SYSTEM WITH START-UP CONTROL CIRCUIT

BACKGROUND OF THE INVENTION

In motor control systems, frequently two or more different operations or functions are performed at successive work stations. Many stations require that the speed of operation at a subsequent station be related to motor speed at the first or master station. This is frequently termed a master-slave motor control system, in that the second motor is slaved or regulated to operate at a speed which is some function of the speed of the first motor. By way of example, in the textile industry a plurality of filaments may be hauled off and twisted into a single strand at a first work station, combined with other strands into a fabric at a subsequent station, dyed at a third process location, and heated for drying at still another point in the system. In this and similar operations precise regulation of the motor speeds at the second, third and fourth stations, relative to the reference speed of the master motor at the first station, is mandatory. Different systems have been devised and operated to maintain the desired speed ratios when the system is operating in its normal speed range. However problems have been encountered in the start-up of a system including at least a master motor and a slave motor. If the master motor drives a tachometer (tach) to provide a speed control signal for the slave motor, at low speeds the tachometer output voltage is not sufficient for effective control of the slave motor. At speeds below 100 rpm it has been found that tach output voltage is below the level requisite for effective control of the slave motor. Nevertheless with multi-station systems such as the one just described, it is a prime requisite that the motors be started simultaneously and remain in synchronization during start-up, when the system is being "threaded" or set for operation.

It is therefore a primary consideration of this invention to provide a start-up control circuit to maintain synchronization between the master and slave motors during system start-up, until the tach output voltage reaches a level which will provide effective master-slave synchronization.

A related consideration is to provide such a circuit which, after this appropriate speed level is attained, provides automatic switch-over from the start-up unit, to thereafter regulate the slave speed as a function of the master motor speed.

SUMMARY OF THE INVENTION

The present invention is useful with a system in which the speed of a first (master) motor is regulated from a first adjusting unit, such as a potentiometer. A second, or slave, motor is regulated in accordance with a speed control signal, which can be derived from the first motor. The invention includes a start-up control circuit which has a second adjusting unit, which also can be a potentiometer. This second adjusting unit is connected to provide a start-up signal which is a function of some condition (for example, position) of the first adjusting unit. Means is provided for applying to the start-up control circuit a speed-indicating signal, which signal is a function of the actual speed of the master or slave motor. Switching means is provided to supply the speed control signal for the slave motor either from the start-up signal, provided by the second adjusting unit, or from the speed-indicating signal, provided from one of the motors. Lastly the control circuit of the invention includes means for regulating operation of the switching means as a function of the speed of either the master or the slave motor.

THE DRAWINGS

In the several figures of the drawings, like reference numerals identify like elements, and in those drawings:

FIGS. 1 and 2 are block diagrams illustrating different system arrangements incorporating the principles of this invention; and FIG. 3 is a schematic diagram illustrating circuit details of the general system depicted more generally in FIG. 2.

GENERAL SYSTEM ARRANGEMENT

FIG. 1 shows a first system arrangement in which a master motor 10 and a slave motor 11 are connected to drive different functions or perform different operations. The motors can be either d-c or a-c motors. Master motor 10 is shown as a d-c motor receiving a speed-governing signal at its field winding 10A over line 12 from a first adjusting unit 13, depicted as a potentiometer. In an a-c system, this d-c signal from unit 13 can be utilized to regulate the frequency of output pulses from a d-c controlled oscillator, or an equivalent arrangement. The exact circuits which receive and use the control signal on line 12 are not important to the understanding and implementation of the present invention. Slave motor 11 receives its speed-governing signal at field winding 11A from line 14 and slave speed control circuit 15. This circuit may be a simple amplifier, to convert the d-c speed control signal on line 16 into an a-c signal for regulating an a-c motor, or other unit for converting or amplifying the signal received over line 16.

An important component of the present invention is a start-up control circuit 20. As shown this circuit receives a speed-indicating signal over line 17 from a tachometer 18 connected to be driven, as represented by broken line 19, as a function of the rotation of master motor 10. Other speed-indicating units could be provided. For example, a timing disc could be driven in place of the tachometer, with a series of apertures positioned to pass between a light source on one side of the disc and a photosensitive receiver on the other side. Other systems are known to those skilled in the art, and can be utilized in place of the tachometer to provide an indication of master motor speed.

In accordance with the invention, start-up control circuit 20 includes a second adjusting unit 21, ganged or mechanically coupled over a connection represented by dashed line 22 to first adjusting unit 13. If both adjusting units are potentiometers, the position of the second unit is adjusted as a function of the position of the first. If both adjusting units were electronic registers, they could be electronically intercoupled to transfer a digital total electrically in lieu of translating a physical position indication. The precise condition or parameter sensed and translated is not a limitation on the basic principles of the invention.

It is manifest that good synchronization between both function channels or both motor speeds is maintained during start-up of the system. After the system reaches operating speed, it is switched over by means to be described in connection with FIG. 3 to regulate slave motor speed as a function of the master motor speed-indicating signal on line 17. If desired this master speed signal can be compared in regulator 24 against a fixed reference voltage based on a suitable speed, and switch-over accomplished when the speed-indicating signal exceeds the reference voltage level. Alternatively the armature voltage of slave motor 11 (as shown generally in FIG. 2) can be passed over line 23 to regulator 24 in start-up control circuit 20. The signal on line 23 can then be compared to the reference voltage in circuit 24 to determine when the speed control signal can be derived from tach 18, after adjusting unit 21 has served in the start-up synchronization.

DETAILED DESCRIPTION OF THE INVENTION

Figure 3:
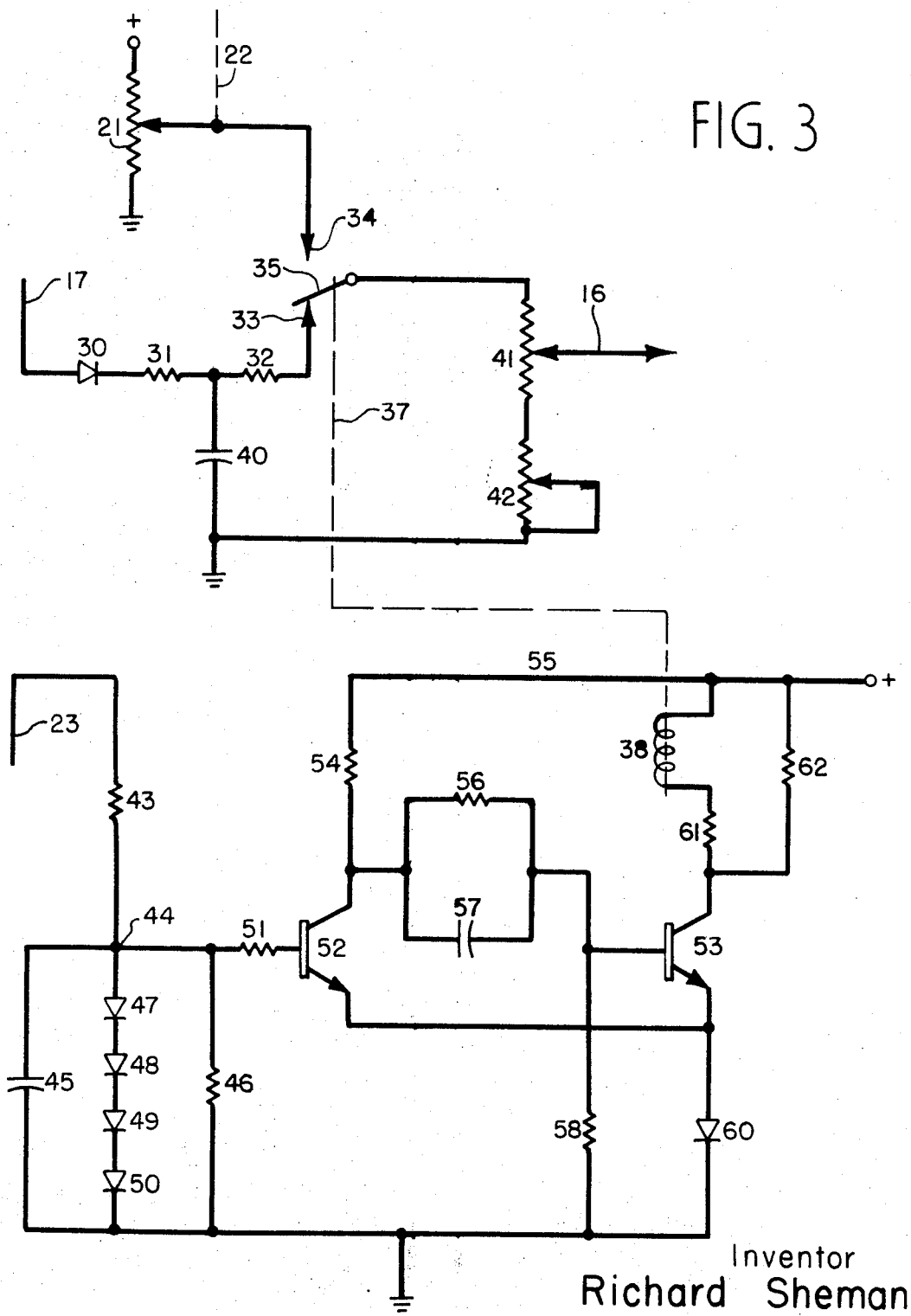

FIG. 3 depicts circuit details of one embodiment of start-up control circuit 20. The circuit includes input conductor 17 for receiving the speed-indicating signal from tachometer 18 to depict the master motor speed. The circuit also includes input conductor 23 for receiving the switching signal which varies as the slave motor armature voltage (or slave motor speed). Conductor 17 is coupled over a series circuit including a diode 30 and resistors 31, 32 to fixed contact 33 of a relay, which includes another fixed contact 34 and a movable contact 35. As represented by the broken line 37, contact set 33–35 is operable between its two positions in response to current flow and interruption of current flow through relay winding 38, as will be described hereinafter. Fixed contact 34 is coupled to the movable arm of potentiometer 21, to receive the start-up signal as this potentiometer has its wiper arm position changed concomitantly with adjustment of potentiometer 13 in the master motor function channel.

A capacitor 40 is coupled between ground and the common connection between resistors 31, 32. A series circuit including a potentiometer 41 and an adjustable resistor 42 is coupled in series between movable contact 35 and ground, or the common reference in this circuit. Adjustable resistor 42 facilitates alignment of the circuit after it has been fabricated, and potentiometer 41 allows for adjustment of the entire start-up control circuit 20 in conjunction with the slave speed control unit or other associated components. The movable arm of potentiometer 41 is coupled to output conductor 16 for passing the speed control signal to the appropriate circuit to regulate the slave motor speed.

Conductor 23 is coupled over a resistor 43 to a common connection point 44. Between point 44 and ground are connected a smoothing capacitor 45, a resistor 46, and four diodes 47–50. Those skilled in the art will appreciate that these diodes represent means for establishing a reference value against which the switching signal on line 23 is compared to determine when the start-up or transitional period of the control system has been completed. A resistor 51 is coupled between point 44 and the base of a first NPN type transistor 52, which is coupled with another NPN type transistor 53 in a Schmitt trigger circuit. The collector of transistor 52 is coupled through a resistor 54 to an energizing line 55, and the collector is also coupled over a parallel circuit including resistor 56 and capacitor 57 to the base of transistor 53. A resistor 58 is coupled between the base of transistor 53 and ground. The emitters of transistors 52, 53 are coupled together, and this common connection is coupled over a diode 60 to ground. The collector of transistor 53 is coupled through a series circuit including resistor 61 and relay winding 38 to energizing line 55. Another resistor 62 is coupled in parallel with resistor 61 and the relay winding.

In operation, the system shown in FIG. 3 is first energized by applying an energizing potential on line 55. At this time the master and slave motors are stopped, and the potentiometers 13, 21 are at their minimum voltage or zero positions. Current flows from energizing conductor 55 over the voltage divider arrangement including resistors 54, 56 and 58 to ground, applying a bias voltage to the base of transistor 53. An energizing potential for the collector of transistor 53 is applied over resistor 62, and over winding 38 in series with resistor 61. Transistor 52 is off under these conditions, but transistor 53 is forward biased and conducts with collector current flowing through relay winding 38. This relay is energized and displaces movable contact 35 from the position shown, engaging contact 33, to the alternate position in which contact 35 engages fixed contact 34. Accordingly the speed control signal with relay 38 energized is derived from the second adjusting unit 21 in the start-up control circuit 20. The master speed control potentiometer 13 is then adjusted in a gradual manner to start up both the master motor 10 and the slave motor 11, allowing the system to reach a low level of speed which will permit threading of a web process machine, or other operation depending on the functions controlled by the motors.

As the speed of both motors gradually increases, the armature voltage of slave motor 11 appearing on line 23 correspondingly increases. Thus the level of the switching signal applied over resistor 43 to common terminal 44 gradually increases, until it exceeds the voltage drop across diodes 47–50. As the switching signal reaches this predetermined value, a signal is applied over resistor 51 to turn on transistor 52, which rapidly conducts. With the well-known action of the Schmitt trigger circuit, transistor 53 is driven off and no current flows through relay winding 38. Contact 35 drops back to engage contact 33, completing the circuit in which the speed-indicating signal on line 17 is applied over contacts 33, 35 to the output conductor 16 of the start-up control circuit. At this time the speed of the slave motor is controlled by the tachometer output signal received over line 17 from the master motor channel.

As depicted generally in FIG. 1, instead of utilizing the slave armature voltage signal on line 23, this line could also be tied back in common with line 17 so that the switching signal is derived from the same source that provides the speed-indicating signal from the master motor. The system arrangement shown in FIG. 2 is the preferred embodiment because of the ease with which such a system can be incorporated in any tachometer-follower system, without the necessity of considering whether the tachometer output voltage is 18, 50 or 100 volts per 1,000 rpm. Another consideration is that the output accuracy of the tachometer itself is a function of load variations applied across the tachometer output terminals.

Although only particular embodiments of the invention has been described and illustrated, it will be apparent to those skilled in the art that various modifications and alterations may be made therein. It is therefore the intention in the appended claims to cover all such modifications and alterations as may fall within the true spirit and scope of the invention.

What is claimed is:

1. A control system in which the speed of a first motor is regulated from a first adjustable unit, and the speed of a second motor is regulated in accordance with a speed control signal, having a start-up control circuit including:

a second adjustable unit, connected to provide a start-up signal which is a function of a condition of the first adjusting unit;

means for applying to the start-up control circuit a speed-indicating signal which is a function of the actual speed of at least one of the motors;

switching means for supplying the speed control signal from one of the start-up and speed-indicating signals; and means for regulating operation of the switching means as a function of the speed of one of the first and second motors.

2. A control system as claimed in claim 1, in which the speed-indicating signal is supplied as a function of the actual speed of the first motor, which speed-indicating signal is applied to both the switching means and to the means for regulating the switching means, to effect a transition in speed control of the second motor from the start-up signal to the first motor speed-indicating signal when the first motor speed-indicating signal attains a predetermined amplitude.

3. A control system as claimed in claim 1, in which the speed-indicating signal is supplied as a function of the actual speed of the first motor and which speed-indicating signal is applied to the switching means, and further comprising means, coupled between the second motor and the switching means, to provide a switching signal as a function of the second motor speed, to regulate operation of the switching means and effect a transition in speed control of the second motor from the start-up signal to the first motor speed-indicating signal when the switching signal indicates the second motor has attained a predetermined speed.

4. A control system as claimed in claim 1 in which said switching means includes a relay having a contact set with a first fixed contact coupled to the second adjusting unit, a second fixed contact connected to receive the speed-indicating signal as a function of the actual speed of the first motor, and a movable contact connected to pass the speed control signal toward the second motor, and further comprising means, coupled between the second motor and the means for regulating operation of the switching means, for providing a switching signal which varies as a function of the speed of the second motor, so that as the second motor attains a predetermined speed, the relay is actuated from the start-up position to the run position in which the speed control signal is supplied in accordance with the speed-indicating signal from the first motor.

5. A control system in which the speed of a master motor is regulated from a first potentiometer, and the speed of a slave motor is regulated in accordance with a speed control signal, having a start-up control circuit including:

a second potentiometer, connected to provide a start-up signal which is a function of the setting of the first potentiometer;

means for applying to the start-up control circuit a speed-indicating signal which is a function of the actual speed of one of the motors;

switching means, including a relay having a winding and a contact set, for supplying the speed control signal from one of the start-up and speed-indicating signals; and a regulator, including the relay winding, for operating the switching means as a function of the speed of one of the master and slave motors.

6. A control system as claimed in claim 5, in which the speed-indicating signal is supplied as a function of the actual speed of the master motor, which speed-indicating signal is applied to both the switching means and to the regulator, to effect a transition in speed control of the slave motor from the start-up signal to the master motor speed-indicating signal when the master motor speed-indicating signal attains a predetermined amplitude.

7. A control system as claimed in claim 5, in which the speed-indicating signal is supplied as a function of the actual speed of the master motor and which speed-indicating signal is applied to the switching means, and further comprising a conductor, coupled between the slave motor and the switching means, to provide a switching signal as a function of the slave motor armature voltage, to regulate operation of the switching means and effect a transition in speed control of the slave motor from the start-up signal to the master motor speed-indicating signal when the switching signal indicates the slave motor has attained a predetermined speed.

8. A control system as claimed in claim 5, in which said contact set includes a first fixed contact coupled to the second potentiometer, a second fixed contact connected to receive the speed-indicating signal as a function of the actual speed of the master motor, and a movable contact connected to pass the speed control signal toward the slave motor, and further comprising means, coupled in the regulator, for providing a reference signal against which the speed-indicating signal is compared, for providing a switching signal to operate the relay as one of the motors attains a predetermined speed, to thereafter control the slave motor speed in accordance with the speed-indicating signal from the master motor.

9. A control system in which the speed of a master motor is regulated from a first potentiometer, and the speed of a slave motor is regulated in accordance with a speed control signal, including a start-up control circuit comprising:

a relay having a winding, first and second fixed contacts, and a movable contact;

a second potentiometer, connected to provide a start-up signal to the first fixed contact, which start-up signal varies in accordance with variations in the setting of the first potentiometer;

a tachometer, connected to be driven as a function of the master motor speed, to supply a speed-indicating signal to the second fixed contact of the relay;

a conductor coupled to the movable contact of the relay, for providing the speed control signal to the slave motor; and a regulator connected to energize and deenergize the relay winding, including a comparison circuit having means for establishing a reference voltage level, a conductor coupled between the slave motor and the comparison circuit, for applying a switching signal which varies as a function of the slave motor speed, and a trigger circuit, coupled between the comparison circuit and the relay winding, for effecting a rapid transition between the nonoperated and operated states of the relay when the amplitude of the switching signal exceeds the reference voltage level.

* * * * *